J. H. Thompson.
Dressing Nuts. &c.
Nº 12,767.  Patented Apr. 24, 1855.
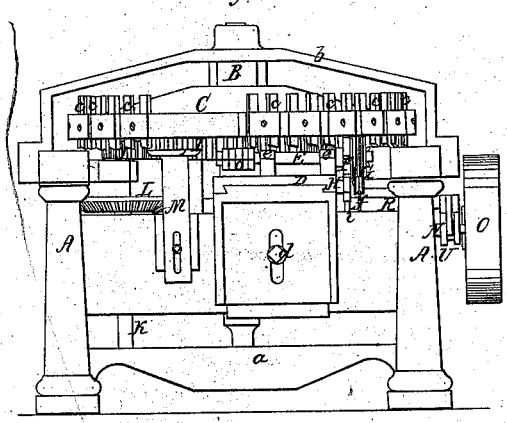
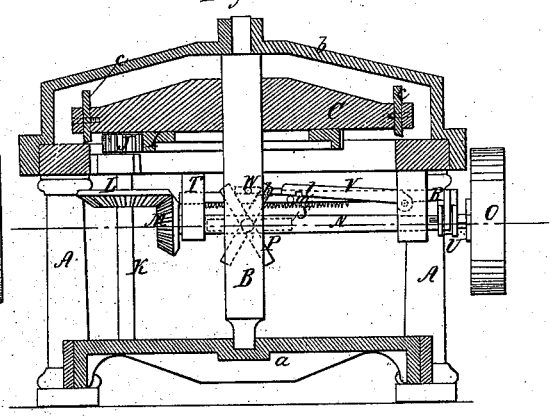
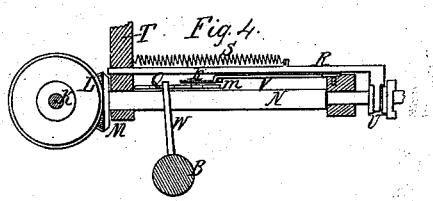
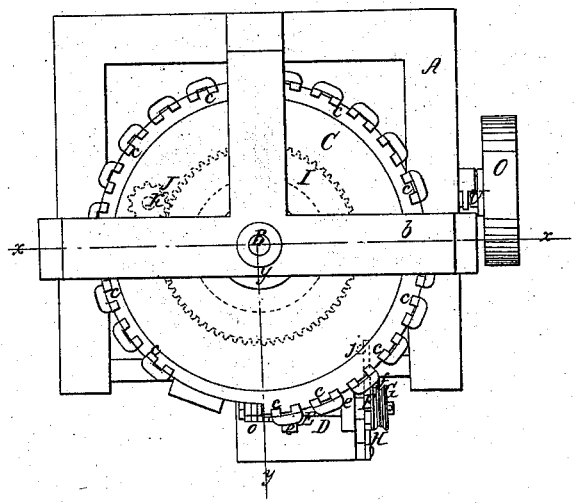
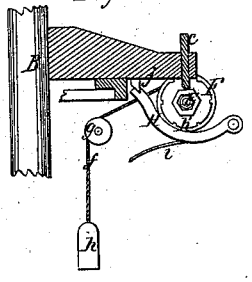

UNITED STATES PATENT OFFICE.

JAMES H. THOMPSON, OF PATERSON, NEW JERSEY.

MACHINE FOR PLANING METAL.

Specification of Letters Patent No. 12,767, dated April 24, 1855.

*To all whom it may concern:*

Be it known that I, JAMES H. THOMPSON, of Paterson, in the county of Passaic and State of New Jersey, have invented a new and Improved Machine for Planing Screw-Nuts and Bars of Any Prismatic Form; and I do hereby declare that the following is a full, clear, and exact description of the same, reference being had to the annexed drawings, making a part of this specification, in which—

Figure 1, is a front view of my improved machine. Fig. 2, is a vertical section of do, (*x*) (*x*) Fig. 3, showing the plane of section. Fig. 3, is a plan or top view of do. Fig. 4, is a plan or top view of a clutch by which a crank or driving pulley is attached to and detached from the driving shaft. Fig. 5, is a transverse section of a portion of the horizontal cutter disk and intermittingly rotating mandril on which the nuts or bar to be planed is placed, (*y*) (*y*) Fig. 3, shows the plane of section.

Similar letters of reference indicate corresponding parts in the several figures.

This invention relates to a new and improved machine for planing prismatic bars, screw nuts, etc., and consists, 1st, in attaching a series of cutters to the periphery of a rotating disk, said cutters being so arranged or attached to the disk that each cutter will project a trifle farther out from the center or shaft of said disk than the one immediately behind it, and by being thus attached to the disk causing the whole of the cutters during one revolution of the disk to plane or pass over a surface equal in width to one side of the nut or bar to be planed. In connection with the disk or cutters thus attached there is used an intermittingly moving mandril which at every revolution of the disk turns a certain required distance and presents an unplaned side of a nut or bar to the action of the cutters as will be hereafter shown and described.

2nd. My invention consists in the peculiar means employed for operating the mandril above referred to, and also in the means employed for throwing the driving pulley in and out of gear with the machine.

To enable others skilled in the art to make and use my invention, I will proceed to describe its construction and operation.

A, Figs. 1, 2 and 3 represents a rectangular frame constructed in any proper manner to support the working parts of the machine.

B, is a vertical shaft the lower end of which is stepped in a cross piece (*a*) at the lower part of the frame A. The upper end of the shaft B has its bearing in a cross piece (*b*) attached to the upper part of the frame A.

To the upper part of the shaft B there is attached a disk C, to the periphery of which a series of vertical cutters (*c*) are attached. The disk C is not perfectly circular see Fig. 3, but varies a trifle therefrom so as to be of scroll form and thereby allow each cutter to be a little farther from the shaft B than the one immediately behind it. The cutting edges of the whole number of cutters therefore will, during one revolution of the disk, pass over a surface equal in width to the difference between the smaller and greater diameters of the disk.

At the front part of the frame A, there is secured by a set screw (*d*), see Fig. 1, a platform or table D, on which a horizontal mandril E works in suitable bearings (*e*) (*e*) see Figs. 1 and 3. To one end of this mandril there is attached a ratchet F, and a loose drum G is also placed on the mandril and connected to the ratchet when it is turned in a direction toward the disk by a spring pawl in the usual manner. To the drum G there is attached a cord (*f*) which passes over a pulley (*g*) attached to the frame A, said cord having a weight attached to its end, see Fig. 5.

H is a lever attached to one side of the platform or table D. To the upper edge of this lever a pin (*h'*) is attached said pin catching in the teeth of the ratchet F in consequence of a spring (*i*), see Figs. 1 and 5.

The upper end of the lever H passes up underneath the disk C, and is acted upon at every revolution of the disk by a projection (*j*) attached thereto as will be hereafter described.

To the under surface of the disk C there is attached a toothed wheel I into which a pinion J gears, said pinion being on the upper part of a vertical shaft K, which works in suitable bearings attached to the frame A. Just below the pinion J and on the same shaft there is a bevel toothed wheel L which gears into a bevel pinion M at the inner end of a horizontal shaft N, at the opposite end of this shaft there is a loose driving pulley or crank O.

P, see Fig. 2 represents a series of radial arms which are connected at their center or point of junction by a pin to a cross bar Q of the frame A. To one of the arms P there is attached a pin (*k*) see Figs. 2 and 3. Directly over the cross bar Q there is a sliding bar R to which one end of a spiral spring S is attached, the opposite end of this spring is attached to an arm T of the frame A. To the outer end of the sliding bar R there is attached a clutch U and to one side of the bar R there is attached a lever V having a notch (*l*) cut in it, which notch fits over a pin (*m*) on the bar R and keeps the clutch U connected to the loose driving pulley O and consequently connects the driving pulley with the shaft N. W is an arm attached to the shaft B, see Figs. 2 and 4.

Operation: Suppose, for instance, that nuts of hexagonal form are to be planed. The nuts are placed upon the mandril E, as shown in Figs. 1 and 3, (*o*) representing the nuts, which may be considered as a hexagonal bar. The platform or table D is then adjusted the proper height by operating the set screw (*d*) and motion is given the shaft N in consequence of power being applied to the pulley or crank O. The disk C is made to rotate by means of the gearing I, J, L, M, and as the cutters (*c*) project gradually farther from the center of the disk C in consequence of its scroll form, the cutters will plane off one side of the nuts (*o*) at one revolution of the disk, the sides of the nuts being equal in width to the space or difference between the longer and shorter diameter of the disk. When the disk has made one revolution, the projection (*j*) strikes against the upper end of the lever H and depresses it and throws the pin (*h'*) on said lever out of the ratchet, and the weight (*h*) rotates the drum G, and consequently the mandril E and nuts (*o*), the space or distance of one tooth of the ratchet and a new side of the nuts is presented to the action of the cutters. The above operation is repeated until all the sides of the nuts are planed. As the shaft B rotates, the arm W, strikes against one of the radial arms P and moves the arms a certain distance at every revolution of the shaft. When the arm to which the pin (*k*) is attached is moved, said pin throws the lever V upward and the notch (*l*) is raised from the pin (*m*) on the sliding bar R and the spring S consequently operates the bar R and disconnects the clutch V from the pulley or crank O.

The number of arms P of course corresponds to the number of sides of the nuts, if square nuts or bars are planed, four arms P, will be required.

By the above invention it will be seen that no feed motion is required because the cutters (*e*) during one revolution of the disk, move over the whole surface of the sides of the nuts or bar to be planed, and consequently the machine is rendered extremely simple. It works rapidly and requires but little attention.

Having thus described my invention what I claim as new and desire to secure by Letters Patent, is—

1. Planing the sides of nuts or prismatic bars, by means of a series of cutters (*c*) attached to the periphery of a disk C of scroll form so that each cutter will project a trifle farther from the center or shaft B of said disk and thereby allow the whole number of cutters to pass over and plane the whole surface of each side of the nuts or bar at one revolution of the disk, as herein shown and described.

2. I claim the employment or use of the disk C with cutters (*c*) attached to its periphery as herein shown, in combination with the intermittingly rotating mandril E for the purpose as set forth.

3. I claim rotating the mandril E intermittingly by means of the lever H, projection (*j*) attached to the disk C, and the ratchet E and drum G operated by a weight (*h*) or its equivalent.

4. I claim operating the clutch U by means of the radial arms P, lever V and spring S attached to the sliding bar R, the arms P being acted upon by the arm W on the shaft B as herein shown and descsribed.

JAMES H. THOMPSON.

Witnesses:
WILLIAM TUSCH,
I. W. COOMBS.